US007632560B2

(12) United States Patent
Filippini Fantoni et al.

(10) Patent No.: US 7,632,560 B2
(45) Date of Patent: Dec. 15, 2009

(54) DOCTOR BLADE COATED WITH POLYMERIC MATERIAL AND COATING METHOD

(75) Inventors: Alberto Filippini Fantoni, Milan (IT); Sveva Filippini Fantoni, Milan (IT); Uberto Filippini Fantoni, Milan (IT)

(73) Assignee: C.B.G. Acciai S.r.l., Caronno Pertusella (VA) (IT)

( * ) Notice: Subject to any disclaimer, the term of this patent is extended or adjusted under 35 U.S.C. 154(b) by 316 days.

(21) Appl. No.: 11/483,611

(22) Filed: Jul. 11, 2006

(65) Prior Publication Data

US 2007/0017392 A1 Jan. 25, 2007

(30) Foreign Application Priority Data

Jul. 21, 2005 (EP) .................................. 05425525

(51) Int. Cl.

| | |
|---|---|
| ***B05D 3/02*** | (2006.01) |
| ***B32B 15/08*** | (2006.01) |
| ***B32B 15/18*** | (2006.01) |
| ***B32B 27/06*** | (2006.01) |
| ***B32B 27/18*** | (2006.01) |

(52) U.S. Cl. ........................ 428/141; 428/213; 428/216; 428/422; 428/457; 427/388.1

(58) Field of Classification Search ........................ None
See application file for complete search history.

(56) References Cited

U.S. PATENT DOCUMENTS 4,755,434 A * 7/1988 Fujii et al. .................. 428/461

(Continued)

FOREIGN PATENT DOCUMENTS

DE 202 16 494 1/2003

(Continued)

OTHER PUBLICATIONS

European Search Report for EP 05 42 5525 dated Dec. 22, 2005.

*Primary Examiner*—Ramsey Zacharia
(74) *Attorney, Agent, or Firm*—Nixon & Vanderhye

(57) ABSTRACT

The present invention refers to a doctor blade (1) comprising a metal support (3) completely coated with a polymeric material.

The doctor blade (1) works in combination with a cylinder (2) and consists of a steel support (3) with a polished surface coated with a layer of variable thickness of polymeric material, comprising:

an ultrathin layer (0) which coats the whole surface of the doctor blade (1);

a thicker layer (6) which coats one side of one edge (4, 5) of the doctor blade (1) or both sides of one edge (4, 5) of the doctor blade (1) or the same side of both edges (4, 5) of the doctor blade (1) or both sides of both edges (4, 5) or one side of the doctor blade (1) or both sides of the doctor blade (1).

In any case, the thicker layer (6) coats at least the side of the edge (4 or 5) of the doctor blade (1) that works in contact with the surface of the cylinder (2) and the front head part of said side.

The polymeric material that constitutes the coating layer is preferably Teflon s®, possibly with solid material added and advantageously with a dry lubricating material (Teflon®, molybdenum sulphide, graphite, etc.) added.

The present invention also refers to a method of coating the metal support (3) of the doctor blade (1) with a layer of variable thickness of polymeric material, in particular of Teflon s®.

17 Claims, 3 Drawing Sheets

U.S. PATENT DOCUMENTS

| | | | | |
|---|---|---|---|---|
| 6,907,210 | B2 * | 6/2005 | Wazana et al. | 399/109 |
| 2002/0157548 | A1 | 10/2002 | Beran et al. | |
| 2004/0137261 | A1 | 7/2004 | Lunnerfjord et al. | |
| 2005/0089706 | A1 | 4/2005 | Urata et al. | |

FOREIGN PATENT DOCUMENTS

| | | |
|---|---|---|
| EP | 1 348 808 | 10/2003 |
| NL | 9300810 | 12/1994 |
| WO | 03/060231 | 7/2003 |

* cited by examiner

FIG. 5
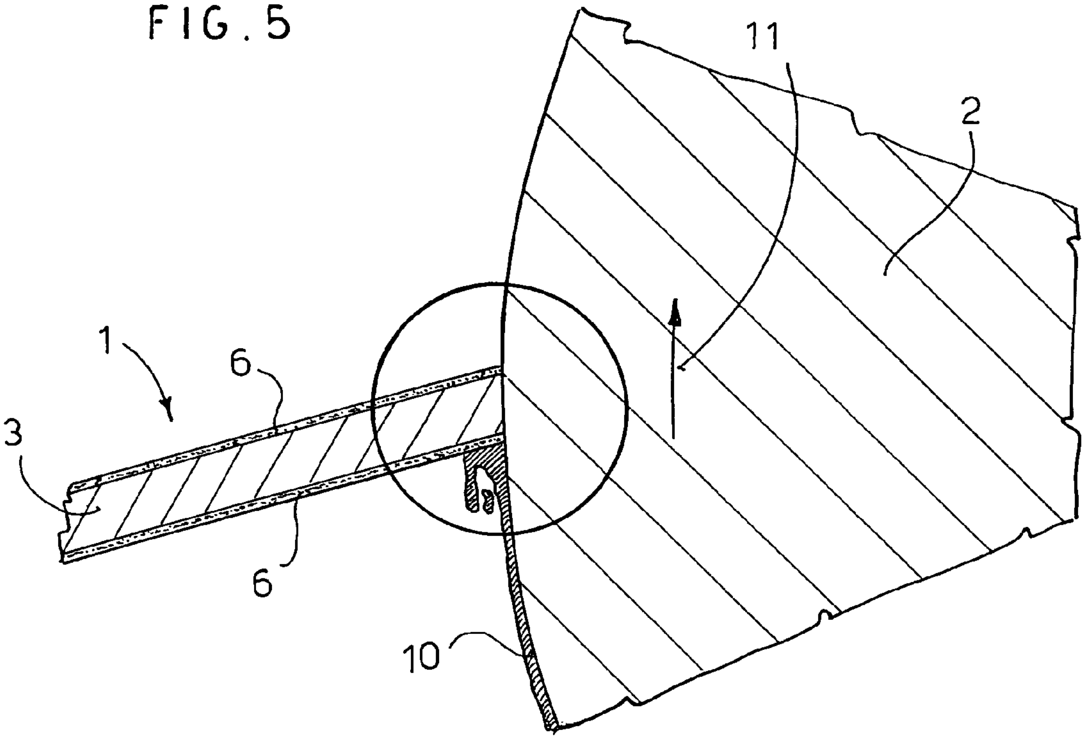
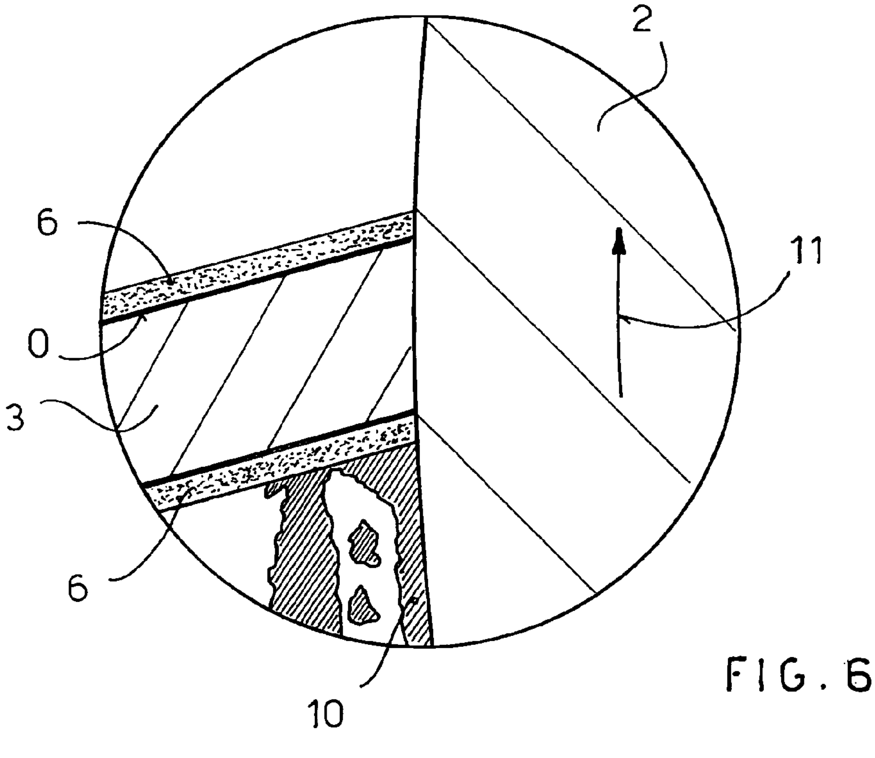
FIG. 6

DOCTOR BLADE COATED WITH POLYMERIC MATERIAL AND COATING METHOD

This application is a new U.S. patent application claiming priority to EP 05 425 525.2 filed 21 Jul. 2005. The entire content of which is hereby incorporated by reference in this application.

BACKGROUND OF THE INVENTION

1. Field of the Invention

The present invention refers to a doctor blade comprising a metal support completely coated with a polymeric material, in particular Teflon s®, and a method of coating said support.

Doctor blades are well-known tools and are normally used to remove from a cylindrical surface—with a finite radius (cylinder) or an infinite radius (flat surface)—a product (liquid, paste or powder) previously adhering to said surface.

Doctor blades can therefore be used in many fields to clean the surface of cylinders used (for example) for printing, for distributing and spreading adhesives, for grinding, etc.

In many printing methods doctor blades are used to distribute printing ink on a frame (such as, for example, in screen printing) or to remove excess ink from a printing cylinder (rotogravure, flexographic printing, etc.) or from a flat processed block (letterpress printing, tampography).

With particular reference to printing presses, a doctor blade operates in direct contact with the surface of the printing cylinder to eliminate the printing ink from the unengraved parts of said surface and the excess ink from the engraved parts of said surface; both the doctor blade and the surface of the printing cylinder are therefore subject to wear since the speed of rotation is high.

Consequently, printing cylinders are often coated with a layer of hard material (for example ceramic material or hard chromium), which can differ according to specific applications.

2. Description of Related Art

The doctor blades for printing presses currently in use mainly consist of a precision steel band, cold rolled, hardened and tempered, in which one or both of the straight edges destined to come into contact with the surface of the printing cylinder have the profile (rectangular, rounded, pre-sharpened with a foil shape or a bevel shape, etc.) considered most advantageous to meet specific requirements on a case by case basis.

To improve the resistance to wear of the edge of the doctor blade without (excessively) damaging the surface of the cylinder, the edge of the doctor blade is coated with thin layers of metal or with chemical nickel (possibly with hard substances added) or thin layers of carbides and/or of metal nitrides or relatively thick layers of ceramic material (metal oxides) are deposited thereon through long, costly procedures.

In order to avoid corrosion phenomena, the doctor blade in many applications consists of an extremely high-cost stainless martensitic steel band.

Doctor blades totally consisting of synthetic materials to improve their adhesion to the surface of the cylinder and to reduce the wear on said cylinder are also known to the art.

The various coatings are applied with methods known to the art, amongst which are spraying, rolling, dipping, powder coating, coil coating or electrolytic deposition (for example of nickel or chromium), etc.

Purely by way of non-limiting example some documents having as their subject matter coated doctor blades are cited.

US-A1-2004/0137261 describes a doctor blade of the type previously described, in which all the coating layers placed on the support (generally steel) are metallic, consisting in particular of electrodeposited nickel with various materials added.

NL-A-9300810 describes a doctor blade wherein the coating layer generally consists of a layer of plastic material, having a smooth surface, which can be different from or coincide with an elastic material fixed beneath the plastic material.

DE-U-20216494 describes a scraper ring (of metal or of carbon fibre) wherein the coating layer placed on the active surface consists of an elastic material chosen among the organic polymers and has a minimum thickness of 1 mm.

US-A1-2002/0157548 describes a doctor blade wherein the coating layer placed on the support (of cold-rolled steel with specific characteristics of composition and hardness) consists of a material with low resistance to wear (preferably) chosen among the metals, or among alloys, oxides, polymers or mixtures thereof; the application methods mentioned are manifold, amongst which there are plasma spraying, galvanising, etc.

US-A1-2005/0089706 describes a doctor blade of the type previously described, wherein the first coating layer placed on the support (of unspecified nature) is always metal (in particular, chromium plating or nickel plating) and the second layer consists of a deposition of organic resin.

None of the doctor blades currently in use, including those described in the above documents, has proved to be able to fulfil the users' requirements completely.

BRIEF SUMMARY OF THE INVENTION

Object of the present invention is to produce a doctor blade able to overcome the abovementioned drawbacks presented by doctor blades of the prior art. This object is achieved by means of a doctor blade which has the characterizing features described hereinafter.

More in detail, the doctor blade forming the subject matter of the present invention consists of a metal support coated—by means of the above mentioned method—with a coating layer of Teflon s® with a variable thickness, possibly with a solid material added.

It is recalled that Teflon s® is a commercially available resin (containing Teflon® with other substances added) and will not therefore be described herein.

Because of its physico-chemical characteristics, Teflon s® proves able to adhere perfectly to the polished surface of the metal support.

In the present description the coating layer with variable thickness consists of Teflon s® but, without departing from the scope of the invention, this coating layer can consist of another functionally equivalent polymeric material.

BRIEF DESCRIPTION OF THE DRAWINGS

The doctor blade will now be described with reference to purely exemplifying (and therefore non limiting) embodiments thereof, illustrated in the appended figures, in which:

FIG. 5 shows diagrammatically, in a partial side view, a printing cylinder in contact with a doctor blade coated with a polymeric material, in particular Teflon s®, with a dry lubricating material added;

FIG. 6 shows diagrammatically, enlarged, the detail highlighted in FIG. 5.

DETAILED DESCRIPTION OF THE INVENTION

Figure 1:
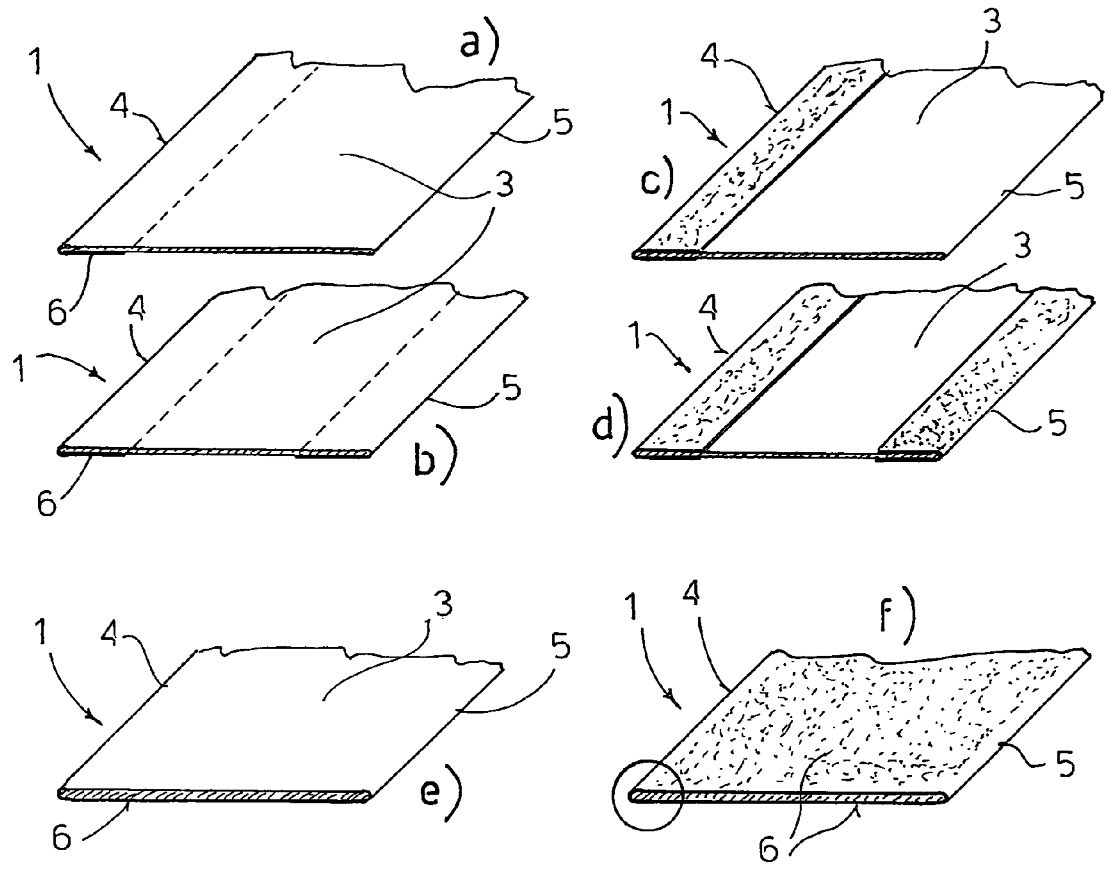
FIG. 1 shows diagrammatically some possible embodiments of a doctor blade according to the invention.

In the appended figures corresponding elements will be identified by means of the same reference numerals.

A doctor blade produced according to the invention, able to operate in combination with a printing cylinder, comprises a metal support coated with a variable thickness layer of Teflon s®, possibly with a solid material added, which comprises an ultrathin layer placed on the whole surface of the metal support of the doctor blade and a thicker layer placed over the ultrathin layer, which partially coats the surface of the doctor blade.

The thicker layer coats one side of an edge of the doctor blade or both sides of an edge of the doctor blade or the same side of both edges of the doctor blade or both sides of both edges of the doctor blade or one side of the doctor blade or both sides of the doctor blade (FIGS. 1a-1f).

In any case, the thicker layer coats at least the side of the edge of the doctor blade that works in contact with the surface of a printing cylinder and the front head part of said side.

The thickness of the ultrathin coating layer protecting the whole surface of the doctor blade is between 0.2 and 0.5 μm, preferably 0.3 μm; the thickness of the thicker layer, where applied with the object of improving the performance of the doctor blade or of the cylinder-doctor blade assembly, is between 1 and 10 μm, preferably 5 μm.

FIG. 1 shows diagrammatically some possible embodiments of a doctor blade produced according to the invention, wherein the ultrathin coating layer 0 (FIG. 2), present on the whole surface of the metal support 3 of the doctor blade 1, has been omitted for the sake of simplicity of the graphic representation.

In particular:

- FIG. 1a shows diagrammatically a doctor blade 1 wherein one of the edges (4 or 5) of the metal support 3 of the doctor blade 1 is coated on one side with the thicker layer 6;
- FIG. 1b shows diagrammatically a doctor blade 1 wherein both edges (4, 5) of the metal support 3 of the doctor blade 1 are coated on the same side with the thicker layer 6;
- FIG. 1c shows diagrammatically a doctor blade 1 wherein one of the edges (4 or 5) of the metal support 3 of the doctor blade 1 is coated on both sides with the thicker layer 6;
- FIG. 1d shows diagrammatically a doctor blade 1 wherein both edges (4, 5) of the metal support 3 of the doctor blade 1 are coated on both sides with the thicker layer 6;
- FIG. 1e shows diagrammatically a doctor blade 1 wherein one side of the metal support 3 of the doctor blade 1 is completely coated with the thicker layer 6;
- FIG. 1f shows diagrammatically a doctor blade wherein both sides of the metal support 3 of the doctor blade 1 are completely coated with the thicker layer 6.

Without departing from the scope of the invention, the edges 4 and 5 of a doctor blade 1 produced according to the invention can have the profile (rectangular, rounded, presharpened with a foil or a bevel shape, etc.) considered most advantageous to meet specific requirements on a case-by-case basis.

The metal support 3 is preferably made from a cold-rolled, hardened and tempered steel band with a polished surface having a roughness no greater than 2 μm.

The material selected for coating of the doctor blade 1 forming the subject matter of the present invention is preferably Teflon s®, possibly with solid material added; this choice ensures excellent adhesiveness of the coating to the polished surface of the metal support of the doctor blade.

Completely coating the whole surface of the metal support 3 of a doctor blade 1 with an ultrathin layer 0 proves advantageous because the doctor blade 1 is destined to operate in an environment and/or in contact with agents that are corrosive, highly oxidising, aggressive etc. which damage (or could damage) the support 3.

Coating, according to requirements, with a thicker layer 6 one side of one edge (4 or 5) of the doctor blade 1 or both sides of one edge (4 or 5) of the doctor blade 1 or the same side of both edges (4, 5) of the doctor blade 1 or both sides of both edges (4, 5) of the doctor blade 1 or one side of the doctor blade 1 or both sides of the doctor blade 1 proves advantageous since the performance of the doctor blade-cylinder assembly is appreciably improved, as detailed hereunder.

The Applicant has verified experimentally that the formation on the metal support 3 of the coating forming the subject matter of the present invention improves the contact between doctor blade 1 and cylinder and therefore the removal from the surface of the cylinder of excess liquids or dust during the scraping process.

The solid material possibly added to the Teflon s® consists of metal micropowder and/or flakes and of dry lubricating material, even of metal carbides if necessary.

The addition of solid material to the mixture advantageously serves to improve the characteristics of hardness, elasticity, resistance to the abrasion, lubricating and non-stick capability of the coating layer.

The metal micropowders and/or flakes are, for example, aluminium, bronze, molybdenum, cobalt, etc.; they advantageously serve to remetallize any microporosities present on the surface of the cylinder during the scraping process.

The dry lubricating material is preferably Teflon®, or graphite, molybdenum sulphide, etc.; advantageously, these particles of dry lubricant serve to dry lubricate the cylinder.

Furthermore these particles of dry lubricant are advantageously released during the scraping process and lubricate, by interposition, the metal-to-metal contact surfaces between the doctor blade and the cylinder; they thus drastically reduce friction and, consequently, wear on the doctor blade and on the cylinder surface.

Moreover said particles of dry lubricant, which have non-stick properties, reduce the stickiness of the surface of the doctor blade and thus the undesired gathering and build-up of substances between the doctor blade and the cylinder surface.

Metal carbides, which have microabrasive properties, if added to the Teflon s®, advantageously serve to obtain the desired microtexture of the cylinder, particularly for rotogravure printing.

The weight of the solid material added to the Teflon s® of the thicker layer 6 is between 10% and 40% of the overall weight of the coating layer of the metal support 3; the weight of the dry lubricating material added to the thicker layer 6 is between 5% and 30% of the overall weight of the coating layer of the metal support 3.

In general the coating is advantageously conceived to have a low surface tension and to repel the majority of the products to be scraped.

It is further advantageously conceived to release molecular powders with opposite polarity to facilitate emptying of the cells of the cylinder during the scraping process.

Figure 2:
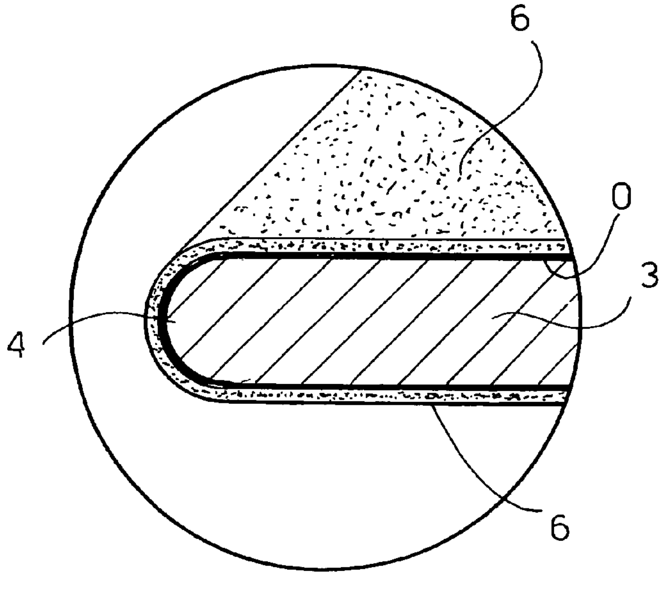
FIG. 2 shows diagrammatically, enlarged, the detail highlighted in FIG. 1*f;*

FIG. 2 shows diagrammatically, enlarged, the detail highlighted in FIG. 1*f*; in FIG. 2 the edge 4 of the metal support 3 coated with the ultrathin layer 0 and with a thicker layer 6 of Teflon s®, possibly with solid material added, which covers the front part and both sides of the edge 4 can be seen better.

Careful, repeated tests carried out by the Applicant have shown that, operating conditions being equal, wear on a doctor blade produced according to the present invention is about 25% less than that on the best-performing doctor blade of the prior art.

Figure 3:
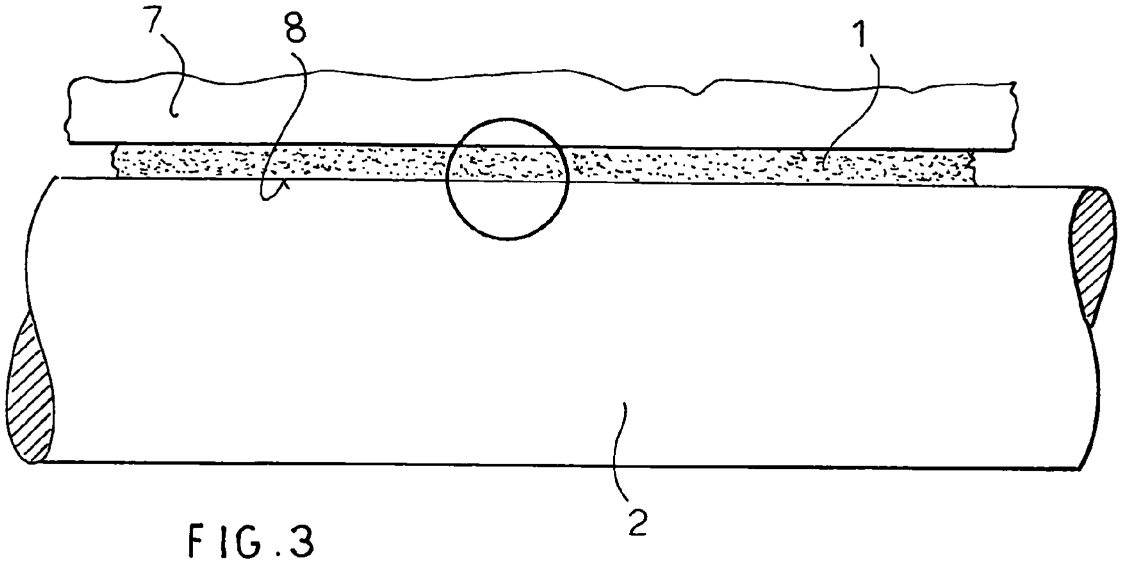
FIG. 3 shows diagrammatically a front view of a doctor blade made according to the invention in contact with the surface of a printing cylinder.
Figure 4:
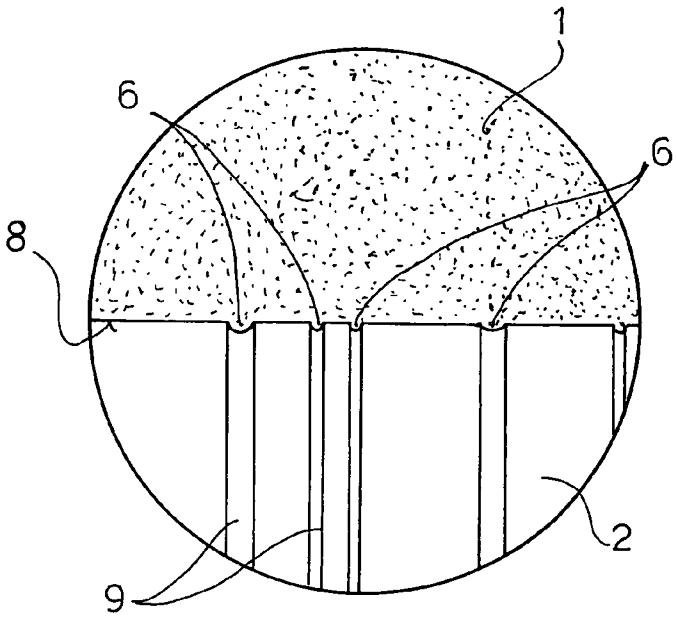
FIG. 4 shows diagrammatically, enlarged, the detail highlighted in FIG. 3.

FIG. 3 shows diagrammatically a front view of a doctor blade 1 placed in contact, along a line of contact indicated by 8 in FIGS. 3 and 4, with the surface of a printing cylinder 2.

In FIG. 3 the doctor blade 1 is carried by a doctor blade holder 7, not described herein as it is per se known and in any case it is outside the scope of the present invention.

As can be seen from FIG. 4 (which shows diagrammatically, enlarged, the detail highlighted in FIG. 3), the thicker layer 6 consisting of Teflon s® possibly with added material penetrates (or can penetrate) into the flaws and into the scratches present on the surface of the cylinder 2 (represented in FIG. 4 by a plurality of grooves 9), improving the adhesion of the doctor blade 1 to the surface of the cylinder 2 and, consequently, the cleaning effect exerted by the doctor blade 1 on said surface.

FIG. 5 shows diagrammatically a partial side view of a printing cylinder 2 in contact with a doctor blade 1 coated on its whole surface with an ultrathin layer 0 (omitted in FIG. 5 for the sake of simplicity of the graphic representation) and on both sides with a thicker layer 6 of Teflon s®, possibly with added material.

The metal support 3 of the doctor blade 1 and a layer 10 of a material (for example ink) which coats the surface of the cylinder 2 and which is removed by the doctor blade 1 can also be seen in FIG. 5; the direction of rotation of the cylinder 2 is indicated in FIGS. 5 and 6 by means of the arrow 11.

As can be seen better from FIG. 6 (which shows diagrammatically, enlarged, the detail highlighted in FIG. 5), during operation the coating layer which coats the front part of the doctor blade 1 is consumed rapidly and only the support 3 and the two thicker layers 6 are in contact with the surface of the cylinder 2: the dry lubricating material released by the two layers 6 facilitates sliding of the doctor blade 1 on the surface of the cylinder 2 and detachment from the surface of the cylinder 2 of the layer of material 10, which slides along the layer 6 of the doctor blade 1 before losing adhesion and falling.

There will now be described the deposition method of the present invention for obtaining the above described variable thickness layer, that is, for distributing a coating varying in thickness from 0.2 to 10.5 μm in a continuous manner along the surface of a metal support 3 consisting of a steel band, which comprises the following steps:

covering both sides of the moving metal support 3 with a superabundant layer of Teflon s® by dipping, spraying or pouring onto the surface of the support 3;

removing the excess amount of Teflon s®, by means of a doctor blade or by means of shaped calibrating rollers, so as to leave on the surface of the metal support 3 the ultrathin layer 0 and the thicker layer 6; and immediately inserting the metal support 3 thus coated into a thermal device (not described in that it is per se known) to fix and to sinter the coating layer applied.

Without departing from the scope of the invention, a person skilled in the art can make to the doctor blade and to the production method previously described all the modifications and the improvements suggested by the normal experience and/or by the natural evolution of the art.

The invention claimed is:

1. A doctor blade, comprising a support coated with a coating layer of polymeric material, characterized in that said coating layer has a variable thickness and comprises an ultrathin layer placed on the whole surface of the support, the ultrathin layer being formed only of polymeric material, and a thicker layer, placed over the ultrathin layer, which partially coats the surface of the doctor blade.

2. A doctor blade as in claim 1, characterised in that the thicker layer coats at least the side of the edge of the doctor blade which works in contact with the surface of a printing cylinder and the front head part of said side.

3. A doctor blade as in claim 2, characterised in that the thicker layer coats one side of one edge of the doctor blade or both sides of one edge of the doctor blade or the same side of both edges of the doctor blade or both sides of both edges of the doctor blade or one side of the doctor blade or both sides of the doctor blade.

4. A doctor blade as in claim 1, characterised in that the support is produced from a cold rolled, hardened and tempered steel band with a polished surface having a roughness no greater than 2 μm.

5. A doctor blade as in claim 1, characterised in that the polymeric material is polytetrafluoroethylene.

6. A doctor blade as in claim 1, characterised in that the polymeric material of the thicker layer has solid material added.

7. A doctor blade as in claim 6, characterised in that the solid material added to the polymeric material comprises metal micropowders and/or flakes and dry lubricating material.

8. A doctor blade as in claim 7, characterised in that the solid material added to the polymeric material further comprises metal carbides.

9. A doctor blade as in claim 7, characterised in that the weight of solid material added to the polymeric material of the thicker layer is between 10% and 40% of the overall weight of the coating layer of the support and the weight of the dry lubricating material added to the polymeric material of the thicker layer is between 5% and 30% of the overall weight of the coating layer of the support.

10. A doctor blade as in claim 7, characterised in that the dry lubricating material consists of polytetrafluoroethylene, molybdenum sulphide or graphite.

11. A doctor blade as in claim 10, characterised in that the dry lubricating material is polytetrafluoroethylene.

12. A doctor blade as in claim 7, characterised in that the metal micropowders and/or flakes consist of aluminium, bronze, molybdenum or cobalt.

13. A method of producing a doctor blade, as in claim 1 by coating the surface of the support with a variable thickness layer of a polymeric material, characterised in that it comprises the following steps:

coating both sides of the moving support with a superabundant layer of polymeric material;

removing the excess amount of polymeric material, by means of a doctor blade or of shaped calibrating rollers, so as to leave on the surface of the support the ultrathin layer and the thicker layer; and immediately introducing the metal support thus coated into a thermal device to fix and to sinter the coating layer applied.

14. A method as in claim 13, characterised in that the superabundant layer of polymeric material is applied to the moving support by dipping, spraying or pouring onto the support.

15. A doctor blade, comprising a support coated with a coating layer of polymeric material, characterized in that said coating layer as a variable thickness and comprises an ultrathin layer placed on the whole surface of the support and a thicker layer placed over the ultrathin layer which partially coats the surface of the doctor blade;

wherein, the ultrathin layer has a thickness between 0.2 and 0.5 μm, and the thicker layer has a thickness between 1 and 10 μm.

16. A doctor blade as in claim 15 wherein the thickness of the ultrathin layer is 0.3 μm.

17. A doctor blade as in claim 15 wherein the thickness of the thicker layer is 5 μm.

* * * * *